(12) United States Patent
Bayrle et al.

(10) Patent No.: US 8,587,570 B2
(45) Date of Patent: Nov. 19, 2013

(54) LCD DISPLAY ELEMENT WITH REDUCE CROSSTALK AT THE INTERSECTION OF ROW LEADS AND ROW ELECTRODES

(75) Inventors: Reiner Bayrle, Langenau (DE); Thomas Bitter, Bad Ditzenbach (DE); Otto Bader, Warthausen (DE); Arnold Simon, Neu Ulm (DE)

(73) Assignee: BMG Gesellschaft fuer moderne Informationssysteme mbH, Ulm (DE)

( * ) Notice: Subject to any disclaimer, the term of this patent is extended or adjusted under 35 U.S.C. 154(b) by 774 days.

(21) Appl. No.: 12/803,855

(22) Filed: Jul. 7, 2010

(65) Prior Publication Data

US 2011/0007045 A1 Jan. 13, 2011

(30) Foreign Application Priority Data

Jul. 8, 2009 (DE) .......................... 10 2009 032 273

(51) Int. Cl.
*G09G 5/00* (2006.01)
(52) U.S. Cl.
USPC .............................. 345/205; 345/90; 345/212
(58) Field of Classification Search
USPC .................................... 345/87–100, 204–215
See application file for complete search history.

(56) References Cited

U.S. PATENT DOCUMENTS

| | | | | |
|---|---|---|---|---|
| 5,313,293 | A | 5/1994 | Hirakata et al. | 359/54 |
| 7,990,355 | B2 * | 8/2011 | Goto et al. | 345/89 |
| 8,159,437 | B2 * | 4/2012 | Goto et al. | 345/89 |
| 2001/0022640 | A1 | 9/2001 | Nakahara | 349/123 |
| 2002/0026734 | A1 | 3/2002 | Bayrle et al. | 40/448 |
| 2002/0109658 | A1 | 8/2002 | Noguchi | 345/92 |
| 2002/0163614 | A1 | 11/2002 | Hinata et al. | 349/139 |
| 2003/0095224 | A1 | 5/2003 | Asakura et al. | 349/143 |
| 2007/0139299 | A1 | 6/2007 | Huang et al. | 345/3.1 |
| 2008/0204389 | A1 | 8/2008 | Bayrle et al. | 345/87 |
| 2008/0291187 | A1 | 11/2008 | Nose et al. | 345/205 |
| 2011/0175858 | A1 * | 7/2011 | Lee et al. | 345/204 |

FOREIGN PATENT DOCUMENTS

| | | |
|---|---|---|
| DE | 2058104 C3 | 11/1970 |
| DE | 4310112 A1 | 3/1993 |
| EP | 1962129 A1 | 2/2008 |
| JP | 2001311955 | 1/2001 |

OTHER PUBLICATIONS

Office action dated Mar. 4, 2010 from German Patent Office in parent German application DE 10 2009 032 273.6 citing documents G, I and L (8 pages).

(Continued)

*Primary Examiner* — Vijay Shankar
(74) *Attorney, Agent, or Firm* — Imperium Patent Works; Darien K. Wallace

(57) ABSTRACT

Crosstalk in the area of intersection between row leads and row electrodes as well as undesired optical effects are avoided in an LCD display element. An LCD display panel is made of the disclosed LCD display elements. By extending the row leads over the full width of the rectangular viewing area in which information is visually displayed, the portion of the viewing area that cannot be controlled by proper drive voltage pulses is minimized. Thus, undesired crosstalk and optical effects are reduced. By driving row electrodes using column voltage sequences of the prior art and by driving column electrodes using row voltage sequences of the prior art, row and column voltage sequences are generated such that an intermediate area of liquid crystal located between the row leads and corresponding row electrodes cannot be driven to a voltage that produces an intermediate condition between an ON condition and an OFF condition.

13 Claims, 13 Drawing Sheets

(56) References Cited

OTHER PUBLICATIONS

Yang et al., "Fundamentals of liquid crystal devices," 2006, John Wiley & Sons, UK; ISBN 9780470015421; pp. 274-278; XP-002598148 (7 pages).

Kaneko, "Directly Addressed Matrix Liquid Crystal Display Panel With High Information Content," Molecular Crystals and Liquid Crystals, 1986, vol. 139, pp. 81-101; ISSN 0026-8941; XP-001079395 (20 pages).

Office action dated Sep. 13, 2010 from the European Patent Office in an application EP 10168901, which is related to parent German application DE 10 2009 032 273.6, citing above documents A (D1), B (D2), C (D3) and D (D4) (9 pages).

* cited by examiner

A–A

B-B

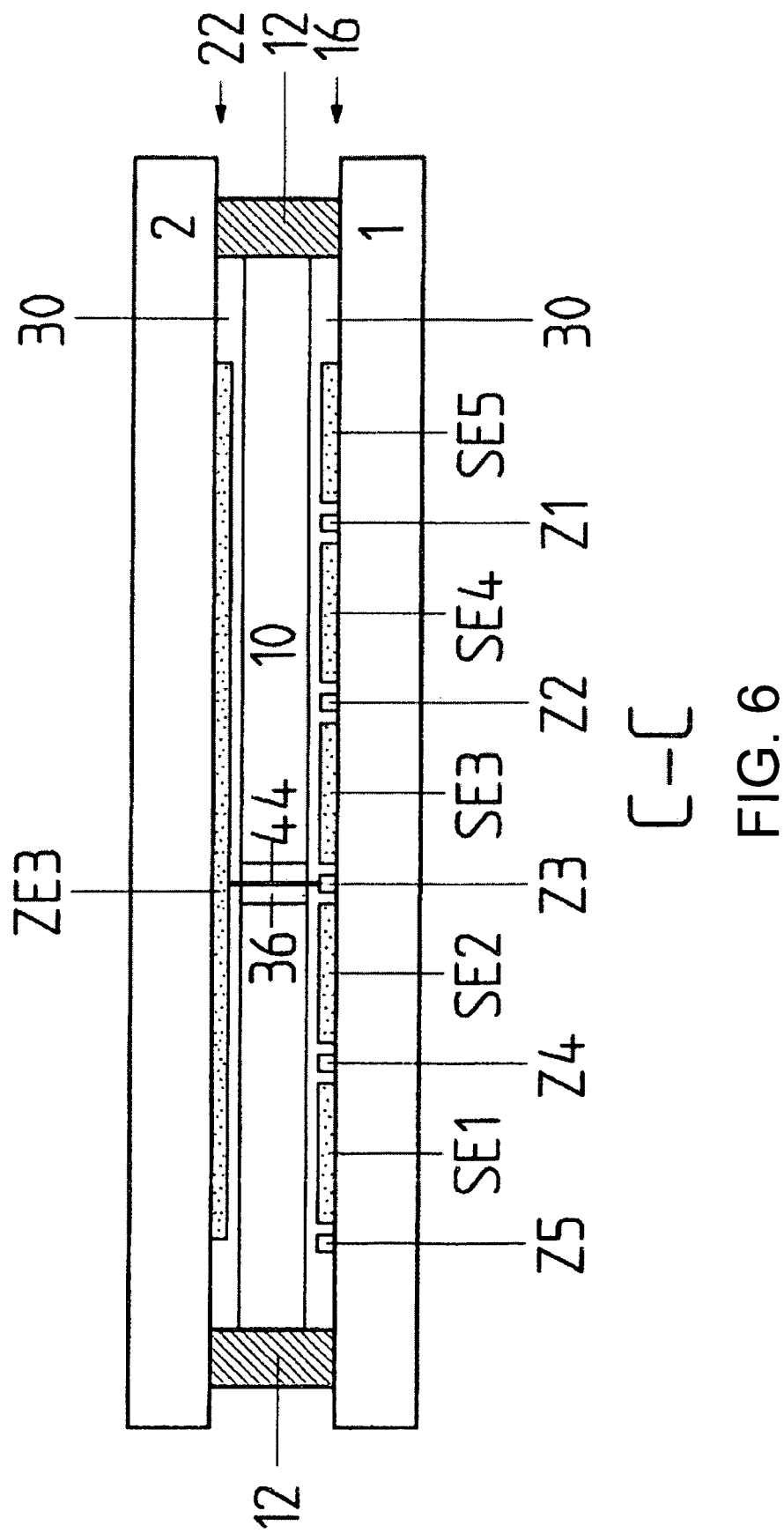
FIG. 6 C-C

SE2  SE3

Z3

ZE3

ZE2

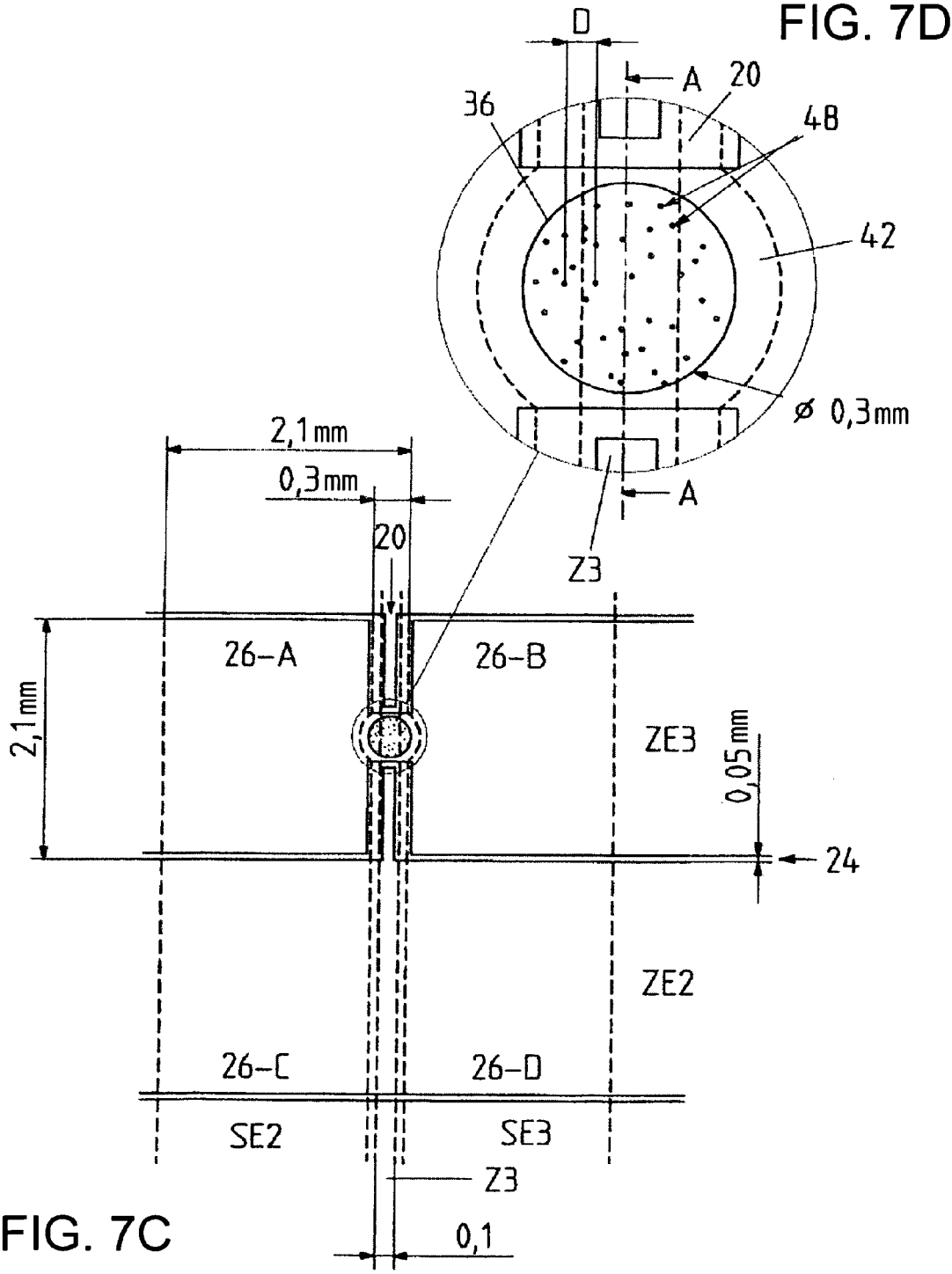

A-A

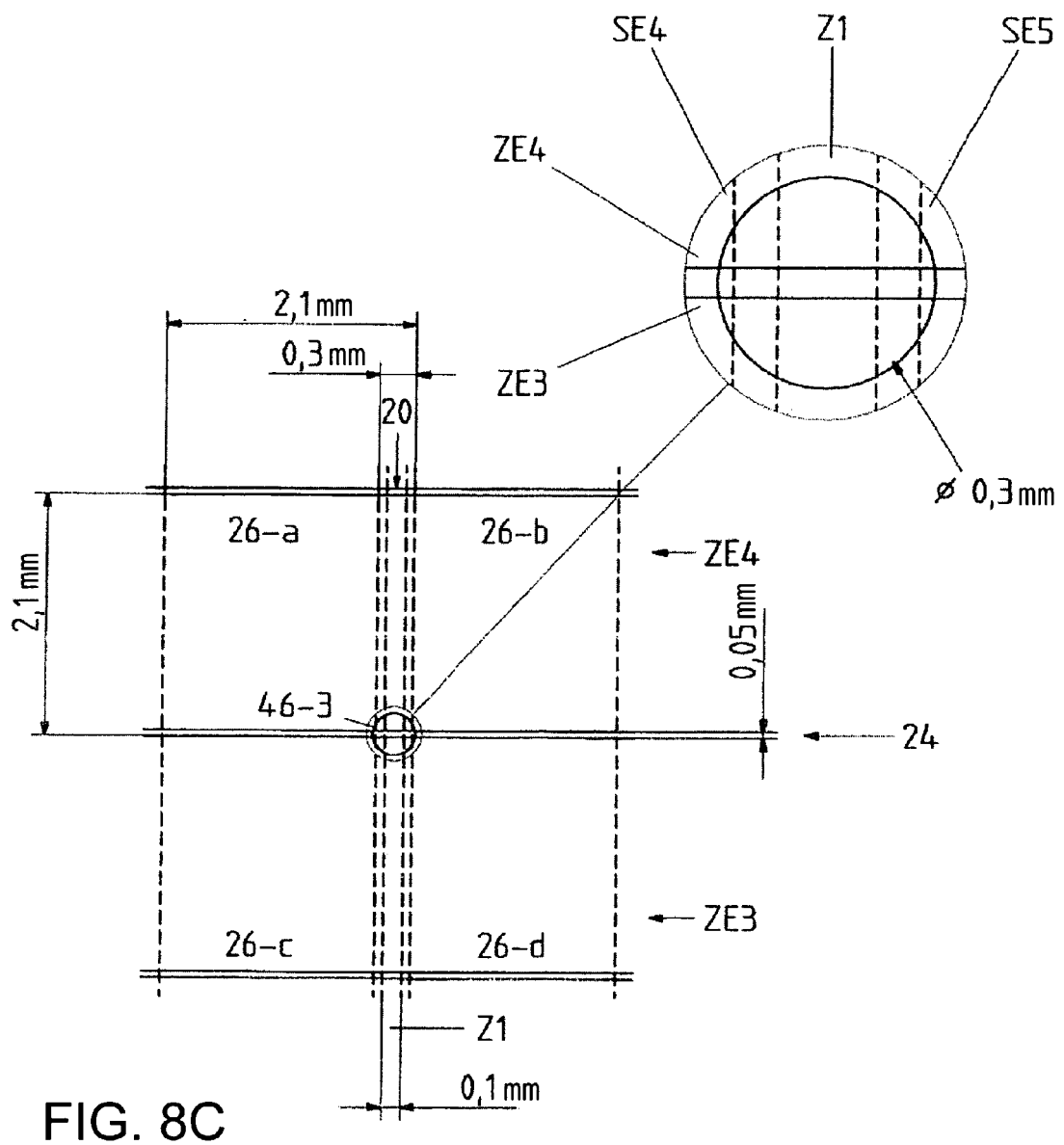

LCD DISPLAY ELEMENT WITH REDUCE CROSSTALK AT THE INTERSECTION OF ROW LEADS AND ROW ELECTRODES

CROSS REFERENCE TO RELATED APPLICATION

This application is based on and hereby claims the benefit under 35 U.S.C. §119 from German Patent Application No. DE 102009032273.6, filed on Jul. 8, 2009, in the German Patent Office, the contents of which are incorporated herein by reference. This application is a continuation of German Patent Application No. DE 102009032273.6.

TECHNICAL FIELD

The present invention relates to an LCD display element, an LCD display panel including a plurality of such LCD display elements, as well as a method for driving and operating an LCD display element or an LCD display panel.

BACKGROUND

Typical LCD display elements include a liquid crystal that is enclosed by means of an adhesive rim between two optically translucent cover plates. An electrode assembly in the form of a matrix with strip-shaped row and column electrodes is arranged on the inner sides of the two cover plates. The strip-shaped row electrodes are separated from one another by separation areas, and the strip-shaped column electrodes are separated from one another by spacing areas. The areas of intersection between row and column electrodes, together with the liquid crystal in between them, define the individual pixels of the LCD display element. The electrode material typically consists of indium tin oxide (ITO).

European patent EP1962129 A1 discloses a passive matrix liquid crystal display element with column electrodes and row leads. The row leads are routed under the adhesive rim in the plane of the column electrodes between the column electrodes towards the contacts. This allows the rim areas to be designed outside the viewing area with the same small width in the area of the left, right, and upper lateral edges. The liquid crystals used in a passive matrix liquid crystal display element are bi-stable, i.e., they possess two stable orientation conditions: reflective (ON condition) and transparent or weakly dispersive (OFF condition). In order to bring about the one or the other stable orientation condition, i.e., in order to switch a particular pixel to ON or OFF and thus bring about the data value 1 or 0, different sequences of voltage pulses for the ON condition and for the OFF condition are applied to the respective row and column electrodes. A plurality of voltage pulses is necessary to ensure stability of the respective condition, reduce switching times, and so as not to reduce the service life of the liquid crystal. In more simple terms, the liquid crystal switches over from the OFF condition to the ON condition upon reaching a particular minimum voltage between the row and column electrodes. In the case of the customarily used sequences of row and column voltage pulses, it was found that the areas of the liquid crystal situated in the areas of intersection between the respective row lead and the row electrodes extending transversely thereto are also driven. In order to avoid such crosstalk, European patent EP1962129 A1 teaches locating the electrical contact points or adhesive dots in these areas of intersection. Inadvertent driving cannot occur in the remaining areas between two column electrodes, as an electrode layer is present on one side of the liquid crystal only. Nevertheless, these small areas that cannot be influenced, or driven, in combination with the drivable pixels bring about undesirable brightness and color effects.

Considering the teachings of European patent EP1962129 A1, it is therefore the object of the present invention to design an LCD display element and an LCD display panel wherein such undesirable, optically visible effects are reduced. It is furthermore the object of the present invention to specify a corresponding method for driving such an LCD display element and LCD display panel.

SUMMARY

An LCD display element includes a first cover plate, a second cover plate, a liquid crystal, a row electrode, a row lead and a means for generating column voltage pulses and row voltage pulses. The liquid crystal is disposed between the first cover plate and the second cover plate and has an ON condition and an OFF condition. The row electrode is routed adjacent to the first cover plate between the first cover plate and the second cover plate. The row lead supplies the row voltage pulses to the row electrode. There is an intermediate area of the liquid crystal that is located between the row lead and the row electrode. The means generates the column voltage pulses and the row voltage pulses such that the intermediate area is prevented from being driven to a voltage that produces an intermediate condition between the ON condition and the OFF condition of the liquid crystal.

The LCD display also has a second row electrode. The row lead extends across the first cover plate and transverses both the row electrode and the second row electrode. Where the row electrode is one of a plurality of row electrodes, the row lead extends to each of the plurality of row electrodes.

A method involves driving pixels to an ON condition and to an OFF condition. The pixels are oriented in a top row Z1, a bottom row Z0, a left column S1 and a right column S0. A first pixel Z1S1 is driven to an ON condition and a second pixel Z1S0 is driven to an OFF condition while preventing an intermediate area between a third pixel Z0S1 and a fourth pixel Z0S0 from being driven to a voltage that is in an intermediate condition between the ON condition and the OFF condition.

The first pixel Z1S1 is driven to the ON condition using a sequence of row voltage pulses UZ11 and UZ12 and a sequence of column voltage pulses US11 and US12. The second pixel Z1S0 is driven to the OFF condition using a sequence of row voltage pulses UZ11 and UZ12 and a sequence of column voltage pulses US01 and US02. The third pixel Z0S1 is driven using a sequence of row voltage pulses UZ01 and UZ02 and a sequence of column voltage pulses US11 and US12. And the fourth pixel Z0S0 is driven using a sequence of row voltage pulses UZ01 and UZ02 and a sequence of column voltage pulses US01 and US02. The sequence of row and column voltage pulses satisfy the following equations:

$$U_{S1max} - U_{S0min} > U_{Z1max} - U_{Z0max}, \text{ and}$$

$$U_{S0max} - U_{S1min} > U_{Z0min} - U_{Z1min},$$

wherein $U_{S1max}$ is the greater of US11 and US12, wherein $U_{S0min}$ is the lesser of US01 and US02, wherein $U_{Z1max}$ is the greater of UZ11 and UZ12, wherein $U_{Z0max}$ is the greater of UZ01 and UZ02, wherein $U_{S0max}$ is the greater of US01 and US02, $U_{S1min}$ is the lesser of US11 and US12, wherein $U_{Z0min}$ is the lesser of UZ01 and UZ02, and wherein $U_{Z1min}$ is the lesser of UZ11 and UZ12.

The pixels are driven with a sequence of row and column voltage pulses such that difference of the maximum voltage of the column voltage pulses US11 and US12 minus the minimum of the column voltage pulses US01 and US02 is maintained above the difference of the maximum voltage of the row voltage pulses UZ11 and UZ12 minus the maximum of the row voltage pulses UZ01 and UZ02. The difference of the maximum voltage of the column voltage pulses US01 and US02 minus the minimum of the column voltage pulses US11 and US12 is maintained above the difference of the minimum voltage of the row voltage pulses UZ01 and UZ02 minus the minimum of the row voltage pulses UZ11 and UZ12. An intermediate area between the third pixel Z0S1 and the fourth pixel Z0S0 is prevented from being driven to a voltage that is in an intermediate condition between the ON condition and the OFF condition.

An LCD display element includes a first column electrode, a second column electrode, a row electrode, a row lead and a spacing area disposed between the first column electrode and the second column electrode. A first pixel is defined by an area of intersection between the row electrode and the first column electrode. The row lead drives the row electrode. The row electrode is one of a plurality of row electrodes, and the row lead passes through the spacing area and extends to each of the plurality of row electrodes. The row electrode includes a constriction. An adjacent row electrode includes a finger-type protrusion that extends towards the constriction.

The LCD display element also includes a first cover plate, a second cover plate, a liquid crystal and adhesive elements. The liquid crystal is disposed between the first cover plate and the second cover plate. The adhesive elements connect the first cover plate and the second cover plate. The first column electrode and the second column electrode belong to a plurality of column electrodes, and the row electrode is one of a plurality of row electrodes. A plurality of spacing areas are disposed between adjacent column electrodes, and a plurality of separation areas are disposed between adjacent row electrodes. The adhesive elements are located at areas of intersection between the spacing areas and the separation areas. Between 1% and 5% of the areas of intersection between the spacing areas and the separation areas are provided with adhesive elements.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a sectional view of the embodiment of FIG. 1 taken along line C-C.

FIGS. 7A-F show various details of an exemplary aspect of the electrical contact elements.

FIG. 8C shows a superposition of FIGS. 8A-B.

FIG. 8D is an enlarged view of the adhesive element of FIG. 8C.

DETAILED DESCRIPTION

Figure 1:
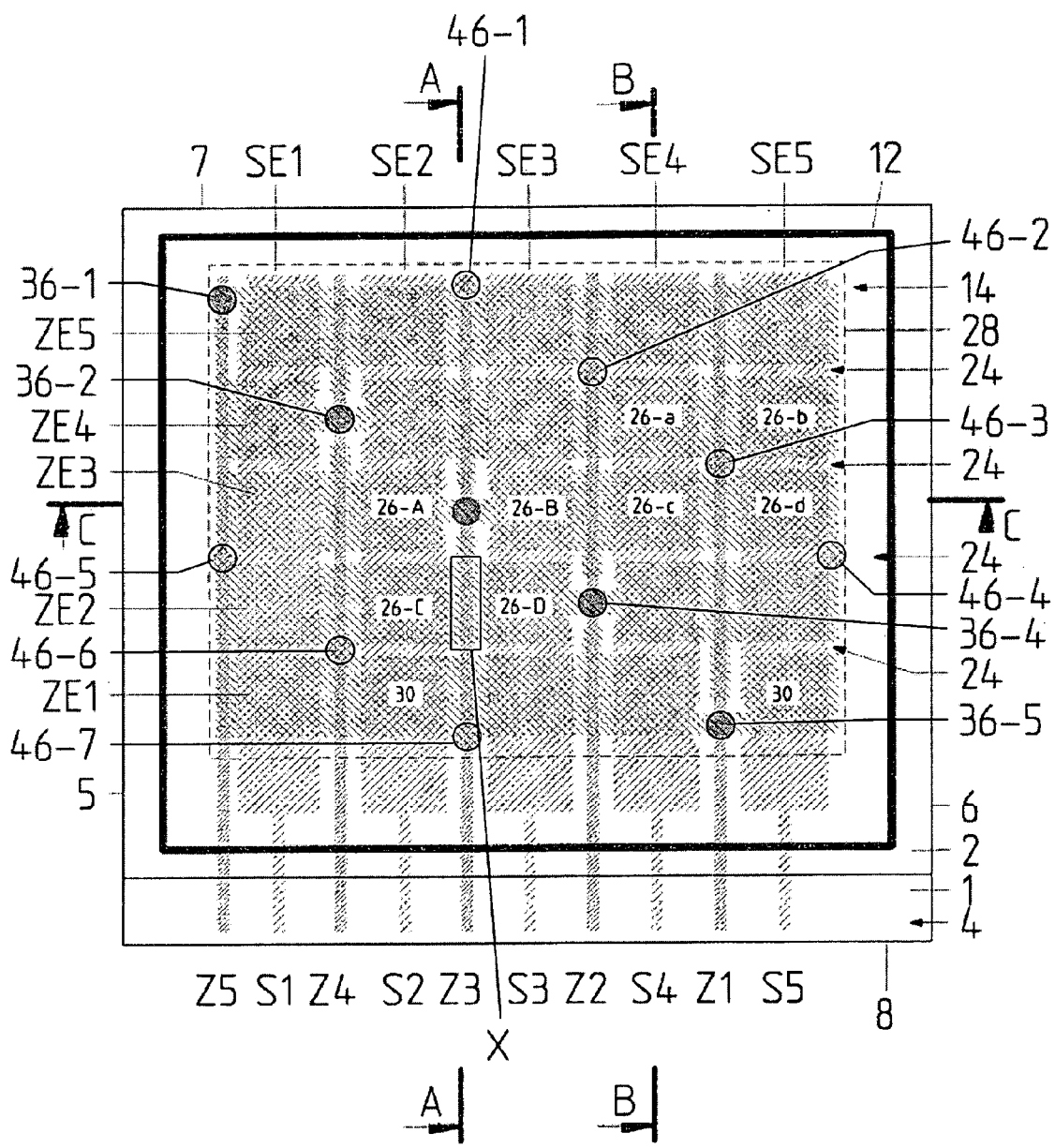
FIG. 1 is a schematic diagram of an exemplary embodiment of the invention.

Reference will now be made in detail to some embodiments of the invention, examples of which are illustrated in the accompanying drawings.

By selecting the voltage pulses for rows and columns in the appropriate manner, the voltage in the area of intersection between row leads and row electrodes can be held above the minimum voltage for the ON condition during the entire sequence of row and column voltage pulses. The voltage pulses for the rows and columns should satisfy the following equations:

$$U_{S1MAX} - U_{S0MIN} > U_{Z1MAX} - U_{Z0MAX} \quad (1)$$

and $$U_{S0MAX} - U_{S1MIN} > U_{Z0MIN} - U_{Z1MIN}, \quad (2)$$

where Z is the number of row electrodes and S is the number of column electrodes. The most straightforward way to satisfy in equations (1) and (2) is to interchange the row voltage pulses and the column voltage pulses when compared to a conventional driving pattern for a passive matrix liquid crystal display element. When the driving voltage pulses satisfy the following conditions, the undesired optical effects are reduced. According to a preferred embodiment, the following is true for the column and voltage pulses:

$$U_{S0MAX} = U_{S1MAX} - \Delta U, \text{ and}$$

$$U_{S0MIN} = U_{S1MIN} + \Delta U.$$

According to another embodiment, the following is true for the column and voltage pulses:

$$U_{Z0MAX} = U_{Z1MAX} - 2\Delta U, \text{ and}$$

$$U_{Z0MIN} = U_{Z1MIN} + 2\Delta U.$$

According to yet another embodiment, the following is true for the column and voltage pulses:

$$U_{Z1MAX} - U_{Z1MIN} = U_{S1MAX} - U_{S1MIN}, \text{ and}$$

$$2\Delta U < (U_{Z1MAX} - U_{Z1MIN})/2$$

According to yet another embodiment, the following is true for the column and voltage pulses:

$$U_{Z1MAX} = U_{S1MAX},$$

$$U_{Z1MIN} = U_{S1MIN}, \text{ and}$$

$$U_{Z1MAX} > U_{S0MAX} > U_{Z0MAX} > U_{Z0MIN} > U_{S0MIN} > U_{Z1MIN}$$

Due to the fact that the electrical row leads extend in the spacing area between two column electrodes across the entire field of view and along the entire length of the column electrodes, irrespective of the position of the electrical contact element, it is possible to reduce the area of the display, or field of view, that cannot be influenced intentionally. As a result of this row lead layout, the areas of the display that cannot be influenced intentionally may be restricted to the electrical contact elements and the adhesive elements.

According to a preferred embodiment, both row and column electrodes are generally stripe shaped. By providing the row electrodes with constrictions at the position of the electrical contact element and the two neighboring electrodes with matching finger-shaped protrusions, the area within the viewing area that cannot be controlled is reduced to the area of the electrical contact elements and the adhesive elements.

By providing recesses in the column electrodes around the electrical contact elements, short circuiting between two adjacent columns by the electrical contact element is prevented. In the event that the number Z of row electrodes is smaller than the number S of column electrodes, one row lead at the most is routed between two column electrodes. In the event that the number Z of row electrodes is greater than or equal to the number S of column electrodes, at least one row lead is routed between all of the column electrodes. In either of these cases, the spacing areas are designed to have a minimum width.

Both row and column leads are lead out through the adhesive rim at a common straight LCD edge or lateral edge. As a result, it is possible to arrange the LCD elements side by side at the remaining lateral edges so as to form an LCD display panel. Providing adhesive elements within the viewing area results in a liquid crystal cell or LCD display element having a constant spacing of the two cover plates because the two cover plates are connected to each other not only in the area of the adhesive rim but also in the area of the adhesive dots.

Distributing the electrical contact elements and the adhesive elements uniformly across the viewing area results in a homogeneous visual impression. This is further enhanced by arranging the adhesive elements in symmetry relative to, and in vicinity of, the electrical contact elements. The electrical contact between row leads, contact elements and row electrodes is maintained even in the event of temperature fluctuations. When the adhesive rim and the adhesive elements are made of the same material, both may be applied onto one of the cover plates in a single operation.

In one embodiment, the conductive particles within the electrical contact elements have a mean diameter dx that is between 10% and 15% greater than the distance D between the two cover plates, and the individual conductive particles are not in continuous contact with each other in a direction parallel to the first or second plane. This arrangement provides electrical contact elements exhibiting electrical conductivity in only one direction, namely, in the direction perpendicular to the first and second planes. The electrical contact elements do not exhibit electrical conductivity in the direction transverse thereto, i.e., in a direction parallel to the first and second planes. As the mean diameter of the conductive particles is somewhat greater than the spacing between the two cover plates, the conductive particles are clamped between the two cover plates, which results in good electrical contact with the respective row electrode and the associated row lead. Accordingly, there is a single- or mono-layer stratum of conductive particles. Because the electrically conductive particles are arranged at a distance from each other, the electrical contact elements are not electrically conductive in the transverse direction, i.e., in a direction parallel to the first and second planes. This desired arrangement of the conductive particles is achieved by a corresponding concentration and a corresponding statistical distribution of the conductive particles in the adhesive material of the electrical contact elements or on the liquid crystal orientation layer in the area of the electrical contact elements.

Figure 2:
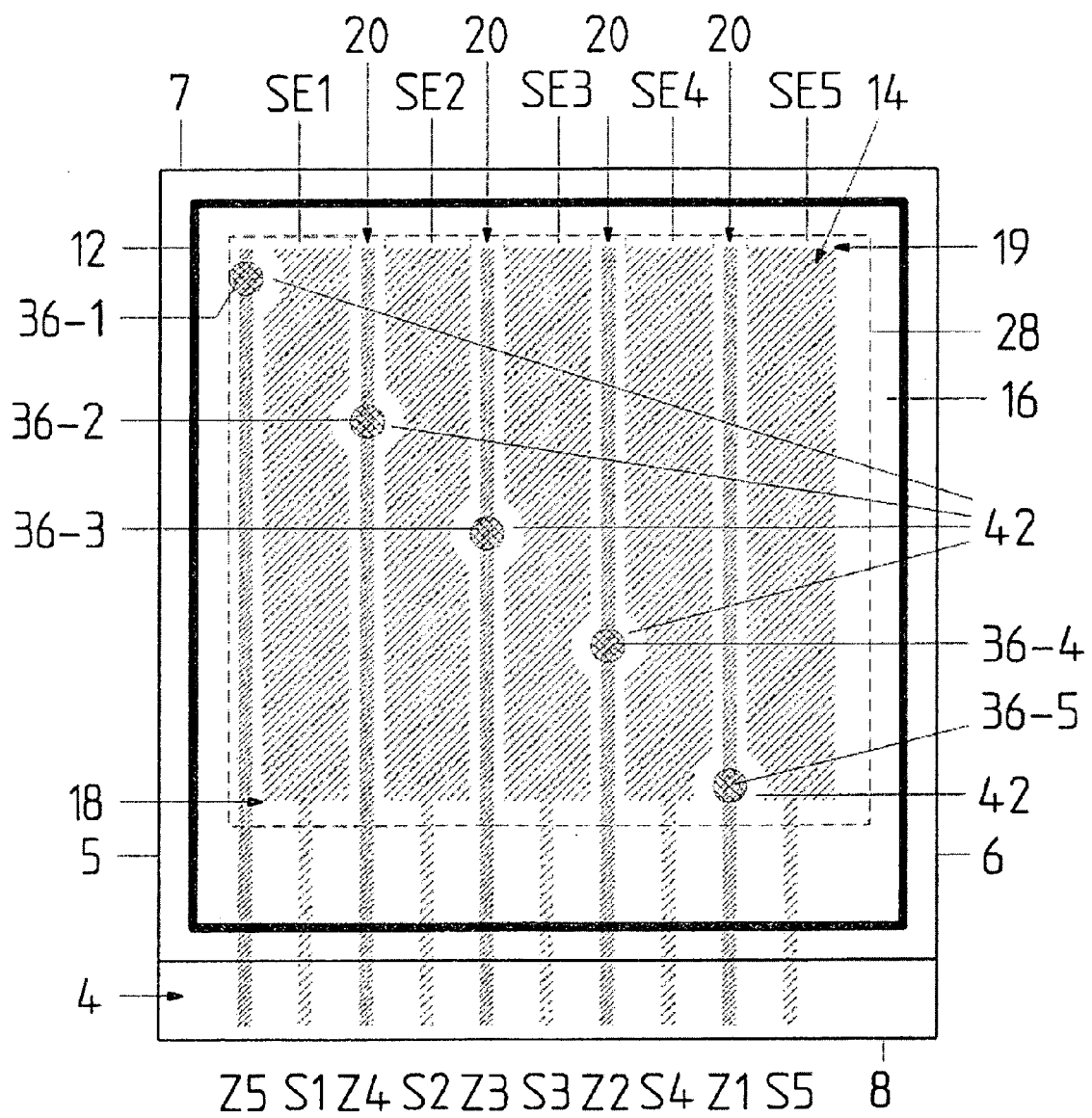
FIG. 2 is a schematic representation of the layout of the column electrodes of the embodiment of FIG. 1.
Figure 3:
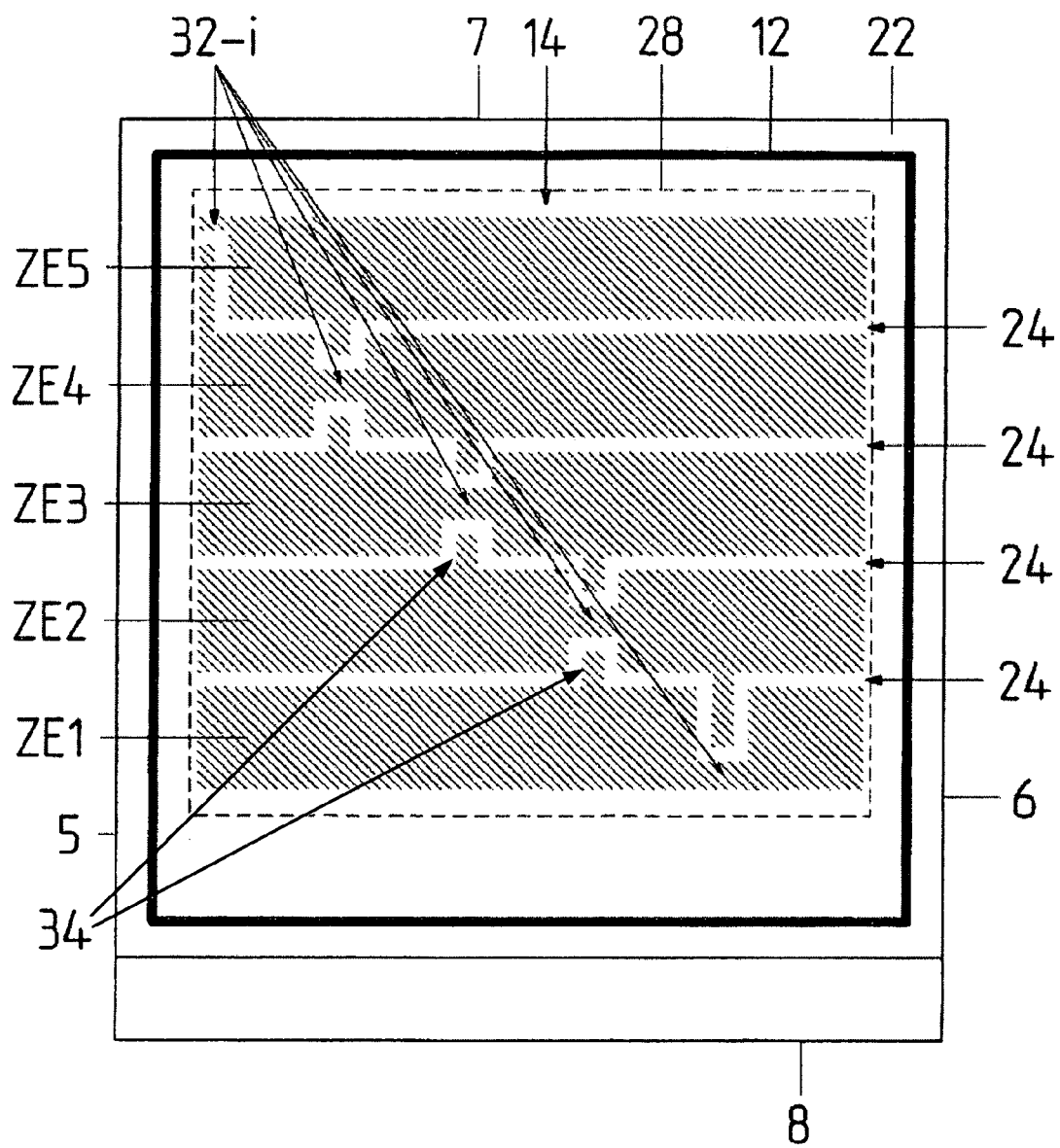
FIG. 3 is a schematic representation of the layout of the row electrodes of the embodiment of FIG. 1.
Figure 4:
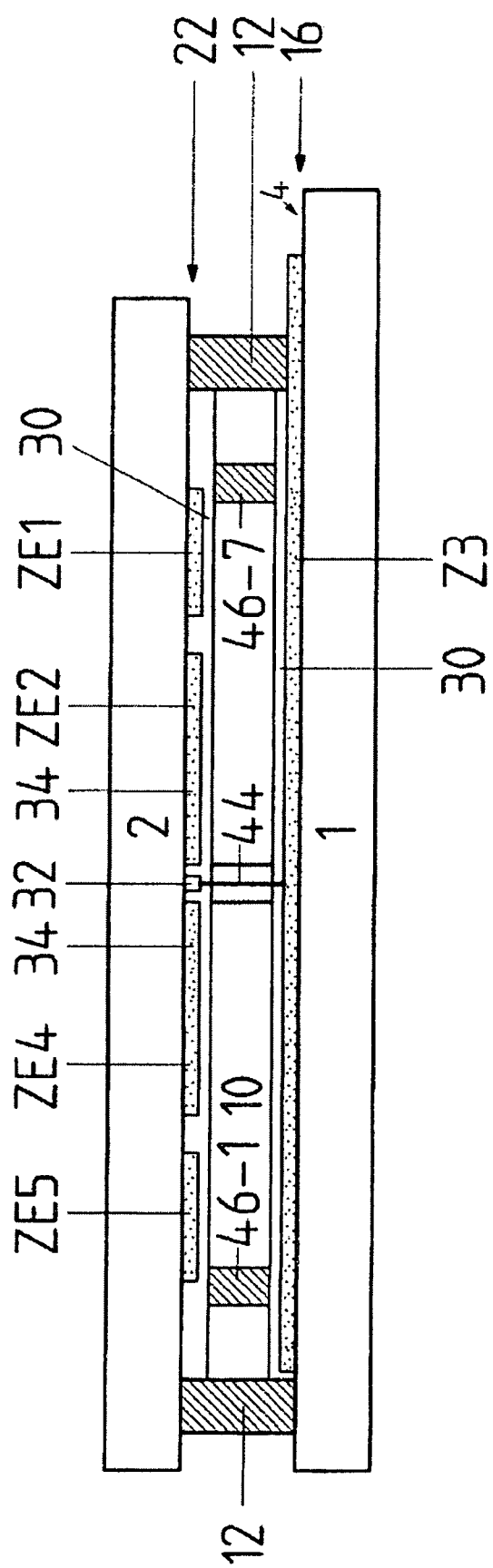
FIG. 4 is a sectional view of the embodiment of FIG. 1 taken along line A-A.
Figure 5:
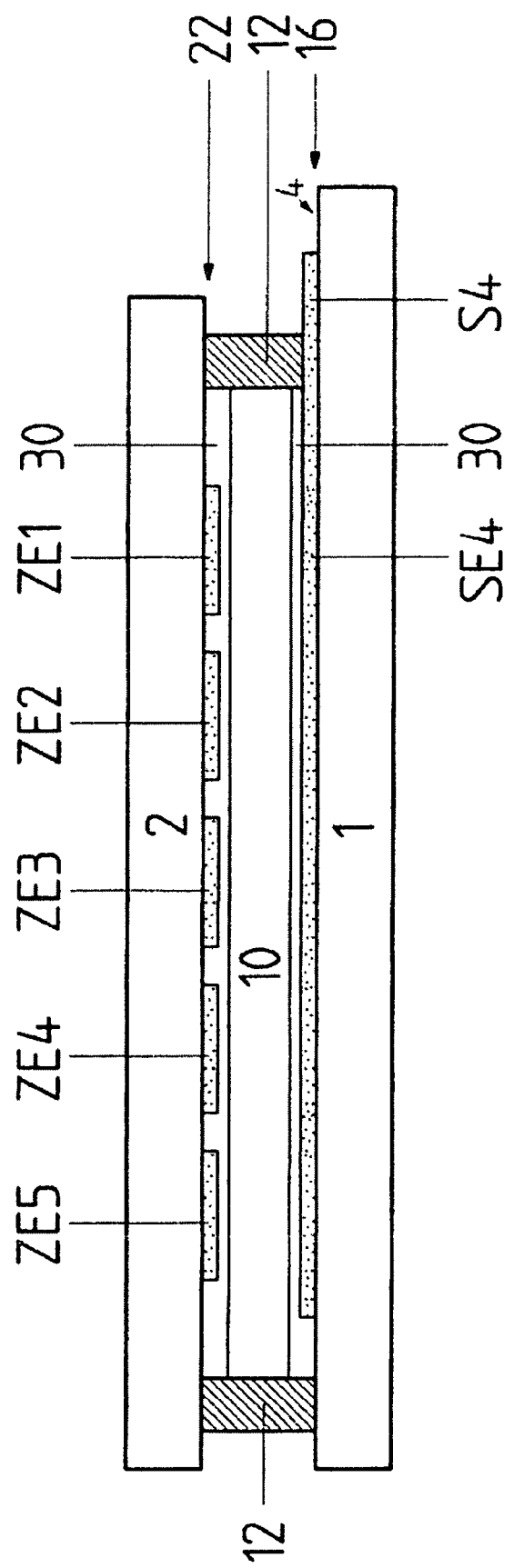
FIG. 5 is a sectional view of the embodiment of FIG. 1 taken along line B-B.

FIGS. 1 through 6 are schematic representations of an exemplary LCD display element, including five rows and five columns. Actual LCD display elements include a larger number of columns and rows. Typically, LCD display elements include between 80 and 350 rows and columns. FIG. 1 shows a rectangular LCD display element having a first optically transparent cover plate 1 and a second optically translucent cover plate 2. The two cover plates 1-2 have an identical width, with the first cover plate having a somewhat greater length so as to create a contact rim 4. The edges of the two cover plates 1-2 define a left lateral edge 5, a right lateral edge 6, an upper lateral edge 7, and a lower lateral edge 8. FIGS. 4-6 show a layer of liquid crystal 10 that is arranged between the two cover plates 1-2. The two optically translucent cover plates 1-2 are connected to each other at a mutual spacing by an adhesive rim 12. The liquid crystal 10 is enclosed completely by the two cover plates 1-2 and the adhesive rim 12.

Inside the adhesive rim 12, a matrix-type electrode assembly 14 is provided that includes five substantially strip-shaped row electrodes ZE1 through ZE5 and five substantially strip-shaped, rectangular column electrodes SE1 through SE5. As shown in FIG. 2, the column electrodes SE are arranged in a first plane 16 on the inside of the first cover plate 1 and include first electrode ends 18 and second electrode ends 19. Spacing areas 20 are provided between the individual column electrodes SE1 through SE5 to electrically isolate the column electrodes SE1 through SE5 from each other. FIG. 3 shows that the row electrodes ZE1 through ZE5 are arranged in a second plane 22 on the inside of the second cover plate 2. The individual row electrodes ZE1 through ZE5 are electrically isolated from each other by separation areas 24. The areas of intersection between the row and column electrodes ZE and SE, together with the liquid crystal 10 between them, define the individual pixels 26 of the LCD display element. The area of these pixels 26 defines a rectangular viewing area 28 in which information is displayed visually. The rectangular viewing area 28 is within the dashed line in FIGS. 1-3. On the inside of the first and second cover plates 1-2, an LCD orientation layer 30 is arranged over the row and column electrodes ZE and SE.

The row and column electrodes ZE and SE are driven via row leads Z1 through Z5 and column leads S1 through S5, respectively. Both the row leads Z1 through Z5 and the column leads S1 through S5 are arranged in the first plane 16 on the inside of the first cover plate 1. The column leads Si contact the respective column electrodes SEi at the first electrode ends 18 thereof. The column leads Si are routed underneath the adhesive rim 12 to the contact rim 4 in the area of the lower lateral edge 8. The row leads Z1 through Z4 are routed between the column electrodes SE in the spacing areas 20. Each electrical row lead Zi that is routed in the spacing areas 20 between adjacent row electrodes SE extends over the full width of the viewing area 28 and does not stop at the respective row electrode ZEi with which the row lead Z makes electrical contact. The fifth row lead Z5 to the fifth row electrode ZE5 is routed in the area between first column electrode SE1 and adhesive rim 12. As an alternative, the fifth row lead Z5 may also be arranged underneath the adhesive rim 12. Both row and column electrodes ZEi and SEi, as well as row and column leads Si and Zi are made of indium tin oxide (ITO).

FIG. 3 shows that each of the individual strip-shaped row electrodes ZEi includes a constriction 32 into which the adjacent row electrodes extend with finger-type protrusions 34. As may be seen from FIG. 2, the individual row leads Z1 through Z5 extend in the first plane 16 across the entire viewing area 28. In the area of the constriction 32 of a row electrode ZEi, electrical contact elements 36-i are provided that displace the liquid crystal 10 from the first plane 16 to the second plane 22 and that have a first contact surface 38 in the area of the first plane 16 and a second contact surface 40 in the area of the second plane 22. The first contact surface 38 establishes electrical contact with the respective row lead Zi, and the second contact surface 40 establishes electrical contact with the constriction 32 of the respective row electrode ZEi.

FIG. 2 shows that the spacing areas 20 are broadened in the area of the electrical contact elements 36 where the column electrodes SE have semi-circular recesses 42. In this way, a sufficient isolation distance is preserved around the first contact surfaces 46 of the contact elements 36. In this manner, short circuits can be reliably avoided. It is noted that the electrical contact elements 36 are electrically conductive only in the direction perpendicular to the cover plates 1-2, not however in the direction transverse thereto. This is indicated by vertical lines 44 in FIGS. 4-6. The manner in which this electrical conductivity in only one direction is achieved is explained below in reference to FIGS. 7D-E.

FIGS. 1-2 show that the first row lead Z1 for driving the first row electrode ZE1 is arranged between the fourth and fifth column electrodes SE4 and SE5. The second row lead Z2 for driving the second row electrode ZE3 is arranged in the area between the third and fourth column electrodes SE3 and SE4. The third row lead Z3 for driving the third row electrode ZE3 is arranged in the area between the second and third column electrodes SE2 and SE3. The fourth row lead Z4 for driving the fourth row electrode ZE4 is arranged in the area between the first and second column electrodes SE1 and SE2. The fifth row lead Z5 for driving the fifth row electrode ZE5 extends on the right, next to the first column electrode SE1.

In the areas of intersection of spacing areas 20 and separation areas 24, adhesive elements 46 and 46-$i$ are arranged in the immediate vicinity of the electrical contact elements 36 in symmetry relative to the latter. The adhesive elements 46 displace the liquid crystal 10 and connect the two cover plates 1-2 to each other. The adhesive elements 46 extend in a straight line on the left and right and in parallel with the line connecting the contact elements 36. Thus, between 1% and 5% of the areas of intersection of separation areas 24 and spacing areas 20 are provided with adhesive elements 46.

The adhesive elements 46 arranged symmetrically relative to the contact elements 36 ensure that the electrical contact surfaces 38 and 40 of the contact elements 36 remain in contact with the respective row lead Zi and the constriction 32 of the respective row electrode ZEi without detaching from them. The electrical contact surfaces 38-40 of the contact elements 36 remain in contact with the row lead Zi and the constriction 32 even in the event of temperature changes.

As described above, FIG. 4 shows a cross-sectional view through the center of the spacing area 20 between second and third column electrodes SE2 and SE3 taken along line A-A in FIG. 1. FIG. 5 shows a cross-sectional view along the fourth column electrode SE4 and the associated fourth column lead S4 along line B-B. FIG. 6 shows a cross-sectional view along a center of the third row electrode ZE3 along line C-C in FIG. 1.

The illustrations in FIGS. 1 through 6 are merely schematic and not true to scale. FIGS. 7-8 are more nearly scale representations of four immediately adjacent pixels 26-A, 26-B, 26-C and 26-D and 26-$a$, 26-$b$, 26-$c$ and 26-$d$, respectively. The pixels 26 have a rectangular base shape. The separation areas 24 have a width of approximately 0.05 mm and are thus much thinner than the spacing areas 20 having a width of approximately 0.3 mm in which the row leads Z are routed. The width of the row leads Z is approximately 0.1 mm. The strip-shaped constrictions 32 of the row electrodes have a width of approximately 1 mm. The diameter of the adhesive elements 46 and of the electrical contact elements 36 is approximately 0.3 mm. The individual pixels 26 have a width of 1.8 mm and a height of approximately 2.1 mm.

Figure 7A:
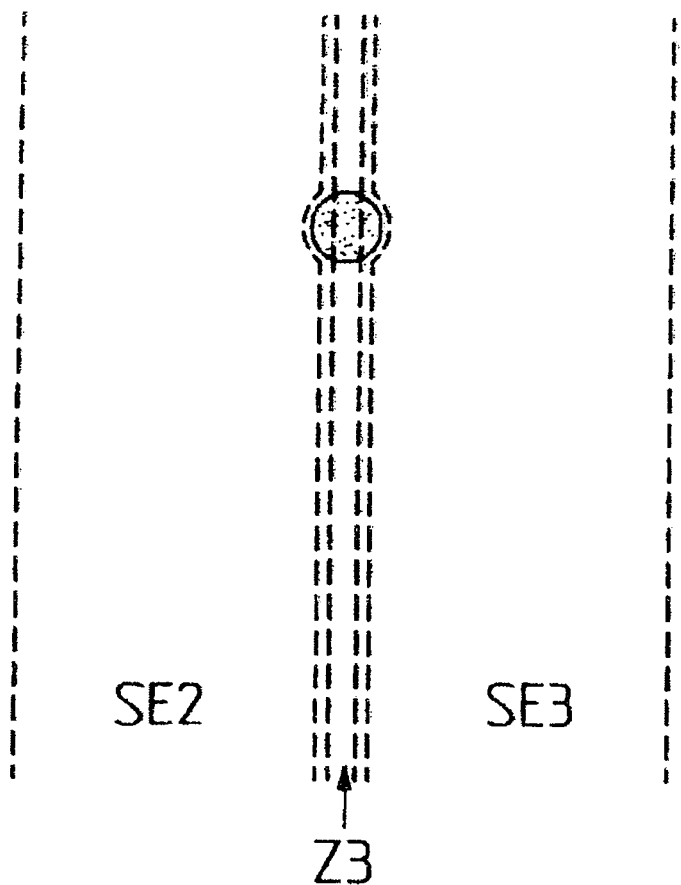
Figure 7B:
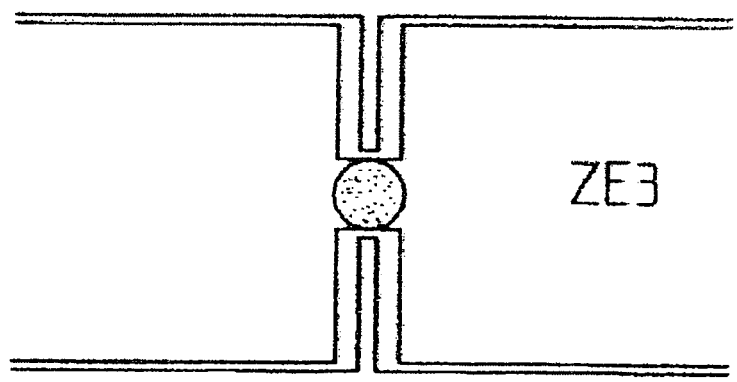
Figure 7E:
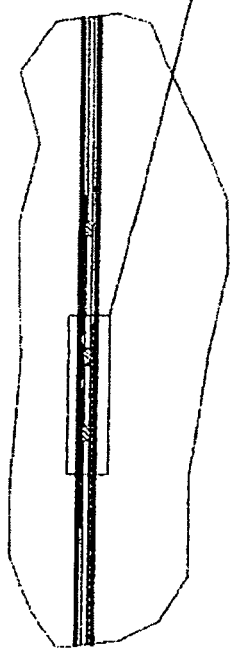
Figure 7F:
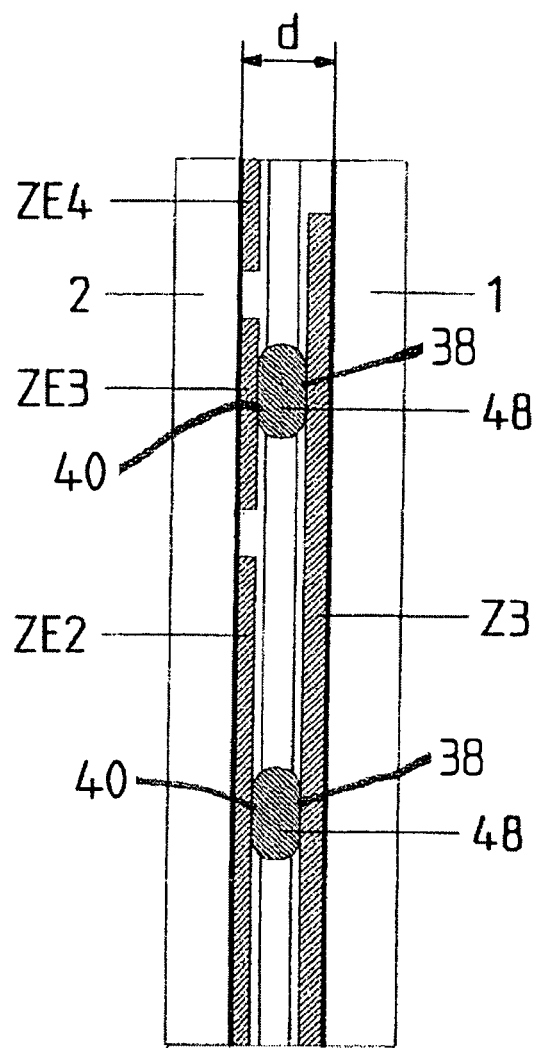

FIGS. 7A-F show detailed views of the electrical contact element 36-4 of FIG. 1 connecting the third row lead Z3 to the third row electrode ZE3. FIG. 7A shows the position of the electrical contact element 36-3 in a top view of the first plane 16, including the second and third column electrodes SE2 and SE3. FIG. 7B shows the position of the electrical contact element 36-3 in a top view of the second plane 22, including the third and second row electrodes ZE3 and ZE2. FIG. 7C shows a superposition of FIGS. 7A and 7B. FIG. 7D shows the electrical contact element 36-3 of FIG. 7C in an enlarged view. FIG. 7E shows a sectional view along line A-A in FIG. 7D. FIG. 7F shows an enlarged portion of the sectional view according to FIG. 7E.

As described above in relation to FIGS. 1 through 6, the electrical contact elements 36 are electrically conductive only in a direction perpendicular to the electrode assembly 14. This is achieved by a particular arrangement and configuration of electrically conductive particles 48 in the electrical contact elements 36. The distance "d" in FIG. 7F of the insides of the two cover plates 1-2 is approximately 5 to 10 μm. The diameter of the electrical contact element 36 in the top view of FIG. 7D is approximately 0.3 mm. The conductive particles 48 have the form of gold-plated plastic globules and have a mean diameter dx that is somewhat larger than the cell gap "d" between the two cover plates 1 and 2. In other words, the mean diameter dx of the conductive particles 48 is between 10% and 20% greater than the spacing "d" of the two cover plates 1 and 2. The conductive particles 48 are accordingly clamped and flattened between the two cover plates 1 and 2 as shown in FIG. 7F. By compressing the conductive particles 48 between plates 1 and 2, an electrical contact is established between the two electrical contact surfaces 38 and 40 and the row electrode ZE and the row lead Z. FIG. 7D shows that the single-layer stratum of electrically conductive particles 48 is statistically distributed over the cross-sectional area of the electrical contact elements 36 such as to result in a mean distance D between the individual particles 48 that is substantially greater than the diameter dx of the conductive particles 48. In this way, the electrical contact elements 36 are electrically conductive in a direction perpendicular to the cover plates 1 and 2 and not electrically conductive in a direction parallel to the two cover plates 1 and 2.

Figure 8A:
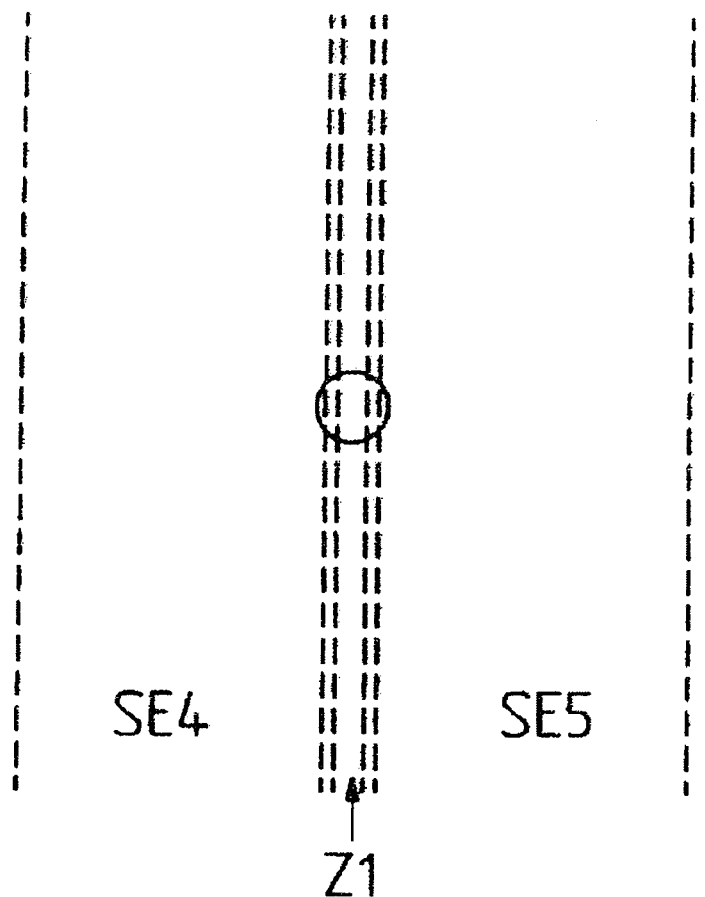
FIGS. 8A-B show details of an adhesive element.
Figure 8B:
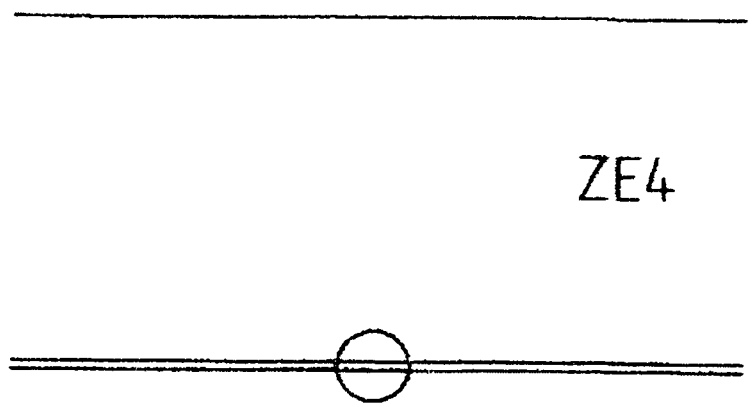

In a manner analogous to the representation in FIGS. 7A-D, FIGS. 8A-D show the adhesive element 46-3 between four pixels 26-$a$, 26-$b$, 26-$d$ and 26-$c$. FIG. 8A shows the position of the adhesive element 46-3 in a top view of the first plane 16, including the fourth and fifth column electrodes SE4 and SE5. FIG. 8B shows the position of the adhesive element 46-3 in a top view of the second plane 22 including the third and fourth row electrodes ZE3 and ZE4. FIG. 8C shows a superposition of FIGS. 8A-B. FIG. 8D is an enlarged view of adhesive element 46-3 in FIG. 8C.

Figure 9:
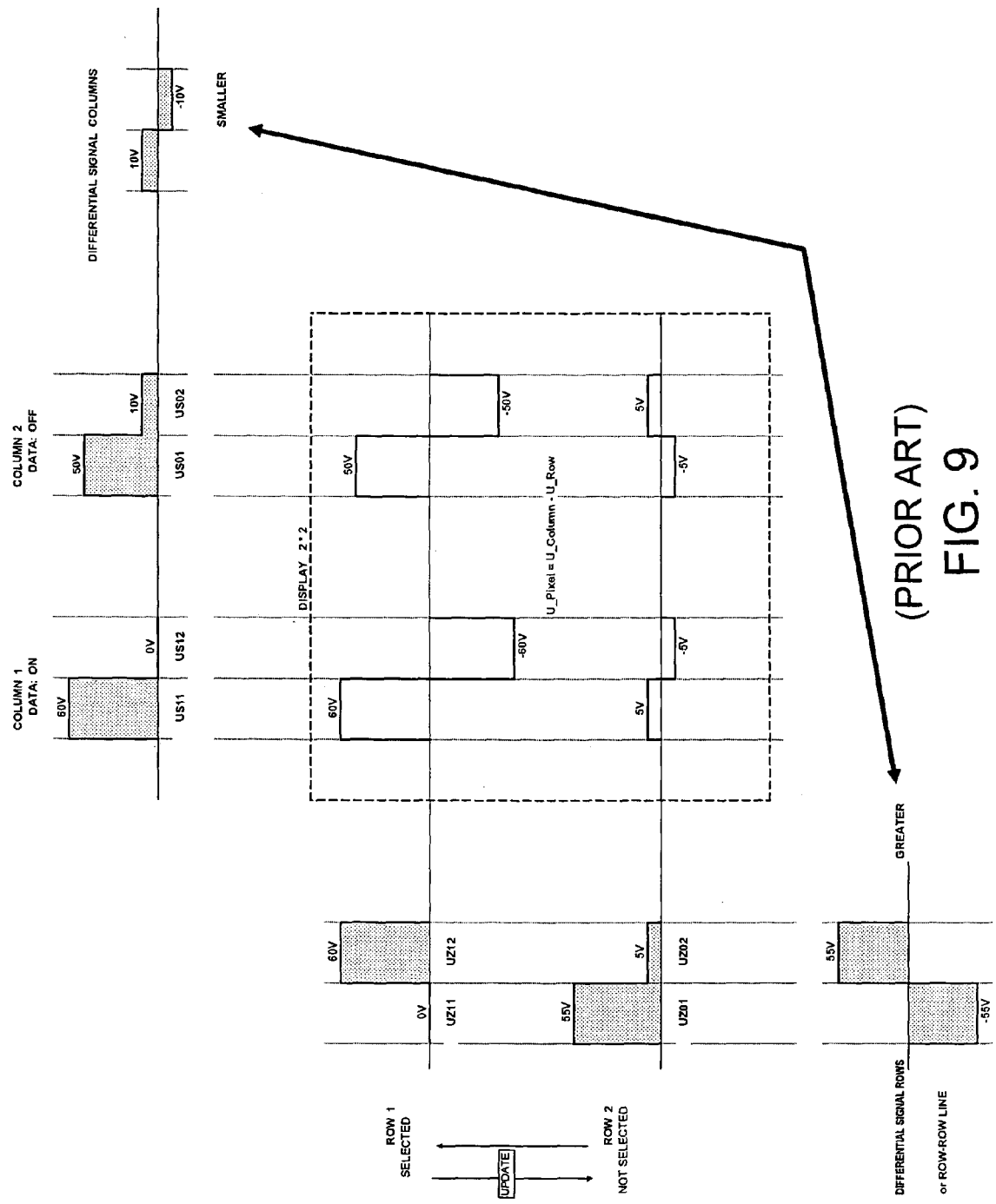
FIG. 9 (prior art) shows signal shapes and signal magnitudes of a multiplex-driven LCD display element in accordance with the prior art of European patent EP1962129.

FIG. 9 (prior art) shows the signal shapes and signal magnitudes of a multiplex-driven LCD display element in accordance with the prior art of European patent EP1962129, wherein each row and column voltage sequence has two voltage pulses, i.e., i=2. In order to drive (ON condition) or not drive (OFF condition) a particular pixel P, a sequence of row and column voltage pulses in the form of two consecutive rectangular wave voltage pulses UZ11 and UZ12 or UZ01 and UZ02 and US11 and US12 or US01 and US02 is applied to the row electrode ZE in question and the associated column electrode SE. Pixel P switches to the ON condition if the resulting pixel voltage $U_P$, being a difference of the applied row and column voltage pulses, is higher than the threshold voltage $U_{SCHWELLE}$ at which the liquid crystal 10 changes over from the OFF condition to the ON condition. For the liquid crystal used in the LCD display elements according to FIGS. 9-10, the threshold voltage $U_{SCHWELLE}$ is ±35 Volts. For the values of row and column voltage pulses indicated in FIG. 9, $U_{S11}$=40 Volts and $U_{S12}$=0 Volts,
$U_{S01}$=30 Volts and $U_{S02}$=10 Volts,
$U_{Z11}$=0 Volts and $U_{Z12}$=40 Volts, and
$U_{Z01}$=35 Volts and $U_{Z11}$=5 Volts.

Consequently, the four pixel voltage pulse pairs $U_{P\alpha1}$ and $U_{P\alpha2}$ $U_{P\beta1}$ and $U_{P\beta2}$, $U_{P\gamma1}$ and $U_{P\gamma2}$, and $U_{P\delta1}$ and $U_{P\delta2}$ indicated in FIG. 9 equal:

$$U_{P\alpha1}=U_{S11}-U_{Z11}=+40V-0V=+40V \text{ and}$$

$$U_{P\alpha2}=U_{S12}-U_{Z12}=0V-40V=-40V,$$

$$U_{P\beta1}=U_{S01}-U_{Z11}=+30V-0V=+30V \text{ and}$$

$$U_{P\beta2}=U_{S02}-U_{X12}=+10V-40V=-30V,$$

$$U_{P\gamma1}=U_{S11}-U_{Z01}=+40V-35V=+5V \text{ and}$$

$$U_{P\gamma2}=U_{S12}-U_{Z02}=0V-5V=-5V$$

$$U_{P\delta1}=U_{S01}-U_{Z01}=+30V-35V=-5V \text{ and}$$

$$U_{P\delta2}=U_{S02}-U_{Z02}=+10V-5V=+5V.$$

Accordingly, only in the case of the resulting pixel voltage pulse pair $U_{P\alpha1}$ and $U_{P\alpha2}$ is the threshold voltage $U_{SCHWELLE}$ of ±35 Volts clearly exceeded, and the pixel in question is placed in the ON condition. For the remaining pixel voltage pulse sequences $U_{P\beta1}$ and $U_{P\beta2}$, $U_{P\gamma1}$ and $U_{P\gamma2}$, and $U_{P\delta1}$ and $U_{P\delta2}$, the voltage values clearly remain below the threshold voltage $U_{SCHWELLE}$ of ±35 Volts so that all of these pixel voltage pulse sequences represent the OFF condition of the respective pixel.

If, for example, pixel 26-A in FIG. 1 were to be switched to the ON condition and pixel 26-C to the OFF condition by a multiplex driving method in accordance with the prior art of European Patent EP1962129, then the row voltage pulse sequence $U_{Z11}$ and $U_{Z12}$, i.e., 0 and 40 Volts for the ON condition, would be applied to the row electrode Z3. On the other hand, the voltage sequence $U_{Z01}$ and $U_{Z02}$, i.e., 35 and 5 Volts for the OFF condition, would be applied to the row electrode Z2. Thus, the liquid crystal 10 in the area X of FIG. 1 in the spacing area 20 between the third row lead Z3 and the second row electrode ZE2 would be applied with the voltage pulse sequences $$U_{X1}=U_{Z11}-U_{Z01}=0V-35V=-35V$$

and $$U_{X2}=U_{Z12}-U_{Z02}=+40V-5V=+35V,$$

which means that the liquid crystal 10 in the area X would be driven by the threshold voltage $U_{SCHWELLE}$ and thus would be in an undesirable intermediate condition between ON and OFF.

Figure 10:
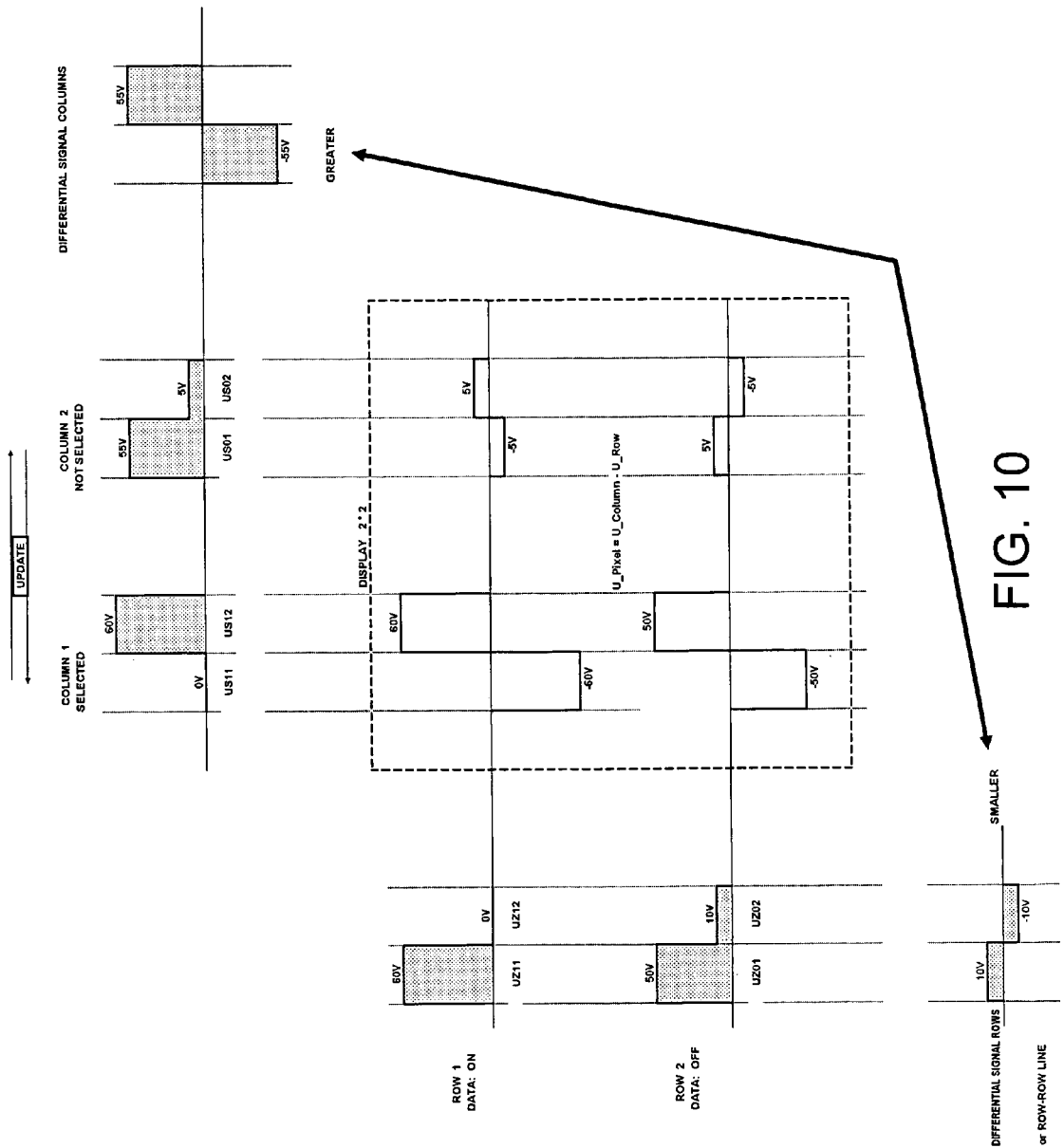
FIG. 10 is a waveform diagram of signals in a multiplex-driven LCD display element in accordance with the present invention.

The embodiments described above avoid this inadvertent generation of the intermediate condition between ON and OFF in the area X in the separation areas 20 between row leads Z and row electrodes ZE by selecting the row and column voltages in accordance with the pulse sequences described above. FIG. 10 illustrates in a manner analogous to FIG. 9 a preferred embodiment of the invention where each row and column voltage sequence includes two voltage pulses, i.e., i=2. In accordance with the row and column voltage pulse sequences represented in FIG. 10, inadvertent switching to the intermediate condition is prevented in a simple manner by interchanging the voltage pulse sequences to be applied to row electrodes and column electrodes. In other words, in accordance with this embodiment, the row electrodes ZE are driven by the column voltage pulse sequences and the column electrodes SE by row voltage pulse sequences used in the prior art. This is represented in FIG. 10. As shown by the area enclosed by a dashed line in FIG. 10, the following situation results for the ON and OFF conditions of individual pixels 26:

$$U_{P\alpha1}=U_{S11}-U_{Z11}=0V-40V=-40V \text{ and}$$

$$U_{P\alpha2}=U_{S12}-U_{Z12}=+40V-0V=+40V,$$

$$U_{P\beta1}=U_{S01}-U_{Z11}=+35V-40V=-5V-0V$$

$$U_{P\beta2}=U_{S02}-U_{Z12}=+5V-0V=+5V,$$

$$U_{P\gamma1}=U_{S11}-U_{Z01}=+0V-30V=+30V \text{ and}$$

$$U_{P\gamma2}=U_{S12}-U_{Z02}=+40V-10V=+30V$$

$$U_{P\delta1}=U_{S01}-U_{Z01}=+35V-30V=+5V \text{ and}$$

$$U_{P\delta2}=U_{S02}-U_{Z02}=+5V-10V=-5V.$$

Accordingly, the threshold voltage $U_{SCHWELLE}$ of ±35 Volts is exceeded clearly for the resulting pixel voltage pulse sequence $U_{P\alpha1}$ and $U_{P\alpha2}$ only, and the pixel in question is unambiguously placed in the ON condition. For the remaining pixel voltage pulse sequences $U_{P\beta1}$ and $U_{P\beta2}$, $U_{P\gamma1}$ and $U_{P\gamma2}$, and $U_{P\delta1}$ and $U_{P\delta2}$, the values clearly remain below the threshold voltage $U_{SCHWELLE}$ of ±35 Volts, so that all of these pixel voltage pulse sequences represent the OFF condition of the respective pixel. Accordingly, the individual pixels are reliably driven ON and OFF by the same pixel voltage pulse sequences that are intended to drive the pixels ON and OFF in the prior art.

Inadvertent switching of the liquid crystal 10 in the area X into the intermediate condition, as occurs in the prior art as shown in FIG. 9, is reliably avoided in the embodiment of FIG. 10. The figures are based on pixel 26-A being switched to the ON condition, and pixel 26-C being switched to the OFF condition. Accordingly, the liquid crystal 10 in the area X in FIG. 1 in the spacing area 20 between the third row lead Z3 and the second row electrode ZE2 is applied with the voltage pulse sequence:

$$U_{X1}=U_{Z11}-U_{Z01}=+40V-30V=+10V$$

and $$U_{X2}=U_{Z12}-U_{Z02}=0V-10V=-10V.$$

The liquid crystal 10 in the area X is reliably switched to the OFF condition. Crosstalk or the generation of an undesirable intermediate condition between row electrodes ZE and row leads Z in the spacing areas 20 is reliably avoided.

In the prior art, the updating and writing direction is performed along lines as shown in FIG. 9 (prior art), wherein it is possible to write all of the rows or only selected ones. Due to the interchange of row and column voltages in the embodiment of FIG. 10, on the other hand, the updating and writing direction is along columns. Thus, it is possible to write all of the columns or only selected ones.

Individual LCD display elements in accordance with the present invention may likewise be connected to form display panels, as is described in relation to FIGS. 9A, 9B and 10 and in European Patent EP1962129. As a result of the shingle arrangement shown in FIG. 10, it is possible to furnish display panels of nearly any desired size.

LIST OF REFERENCE SYMBOLS

ZE1 through ZE5 row electrodes
SE1 through SE5 column electrodes
Z1 through Z5 row leads
S1 through S5 column leads
1 first cover plate
2 second cover plate
4 contact rim
5 left lateral edge
6 right lateral edge
7 upper lateral edge
8 lower lateral edge
10 liquid crystal
12 adhesive rim
14 electrode assembly
16 first plane
18 first electrode end
19 second electrode end
20 spacing areas
22 second plane
24 separation areas
26 pixel
28 viewing area
30 LCD orientation layer
32 constriction of row electrodes
34 finger-type protrusion
36 electrical contact elements
38 first contact surface of contact element 36
40 second contact surface of contact element 36
42 recess in column electrodes
44 vertical lines in contact element 36
46 adhesive elements
48 conductive particles in contact element 36

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An LCD display element, comprising: a first column electrode; a second column electrode; a row electrode, wherein an area of intersection between the row electrode and the first column electrode defines a first pixel; a spacing area disposed between the first column electrode and the second column electrode; and a row lead that drives the row electrode, wherein the row electrode is one of a plurality of row electrodes, and wherein the row lead passes through the spacing area and extends across each of the plurality of row electrodes;
wherein the LCD display element further comprising: a first cover plate; a second cover plate, wherein the second cover plate is parallel to the first cover plate and is separated from the first cover plate by a distance; and a liquid crystal disposed between the first cover plate and the second cover plate, wherein the row lead is electrically connected to the row electrode by a contact element, wherein the contact element includes conductive particles that have an uncompressed mean diameter that is between 10% and 15% greater than the distance between the first cover plate and the second cover plate.

2. The LCD display element of claim 1, wherein the row electrode includes a constriction.

3. The LCD display element of claim 2, wherein an adjacent row electrode includes a finger-type protrusion that extends towards the constriction.

4. The LCD display element of claim 1, wherein the row lead is electrically connected to the row electrode by a contact element, and wherein the first column electrode includes a recess around the contact element such that the spacing area is broadened around the contact element.

5. The LCD display element of claim 1, further comprising:
an adhesive rim with four straight edges that surrounds the first pixel and other pixels defined by areas of intersection between row electrodes and column electrodes; and
a plurality of column leads, wherein the row lead is one of a plurality of row leads, and wherein the plurality of row leads and the plurality of column leads all pass under one of the four straight edges of the adhesive rim.

6. The LCD display element of claim 1, further comprising:
a first cover plate;
a second cover plate;
a liquid crystal disposed between the first cover plate and the second cover plate; and
adhesive elements that connect the first cover plate and the second cover plate, wherein the first column electrode and the second column electrode belong to a plurality of column electrodes, wherein the row electrode is one of a plurality of row electrodes, wherein a plurality of spacing areas are disposed between adjacent column electrodes, wherein a plurality of separation areas are disposed between adjacent row electrodes, and wherein the adhesive elements are located at areas of intersection between the spacing areas and the separation areas.

7. The LCD display element of claim 6, wherein between 1% and 5% of the areas of intersection between the spacing areas and the separation areas are provided with adhesive elements.

8. An LCD display element, comprising: a first cover plate; a second cover plate; a liquid crystal disposed between the first cover plate and the second cover plate, wherein the liquid crystal has an ON condition and an OFF condition; a row electrode adjacent to the first cover plate between the first cover plate and the second cover plate; a row lead that supplies row voltage pulses to the row electrode, wherein an intermediate area of the liquid crystal is located between the row lead and the row electrode; and means for generating column voltage pulses and the row voltage pulses such that the intermediate area is prevented from being driven to a voltage that produces an intermediate condition between the ON condition and the OFF condition; wherein the LCD display element further comprising: S column electrodes, wherein the row electrode is one of Z row electrodes, wherein S is greater than Z, wherein the row lead is one of S-1 row leads, wherein one of the S-1 row leads is disposed adjacent to the second cover plate between each two adjacent column electrodes, and wherein at least one of the S-1 row leads is not electrically connected to any of the Z row electrodes.

9. The LCD display element of claim 8, further comprising:
a second row electrode, wherein the row lead extends across the first cover plate and transverses both the row electrode and the second row electrode.

10. The LCD display element of claim 8, wherein the row electrode is one of a plurality of row electrodes, and wherein the row lead extends across each of the plurality of row electrodes.

11. The LCD display element of claim 8, wherein the row electrode includes a constriction, and wherein the row lead is electrically connected to the row electrode at the constriction.

12. The LCD display element of claim 11, wherein a finger-type protrusion extends from an adjacent row electrode towards the constriction of the row electrode.

13. The LCD display element of claim 8, further comprising:
- an adhesive rim with four straight edges that surrounds the liquid crystal and that is disposed between the first cover plate and the second cover plate; and
- a plurality of column leads, wherein the row lead is one of a plurality of row leads, and wherein the plurality of row leads and the plurality of column leads all pass under one of the four straight edges of the adhesive rim.

* * * * *